United States Patent
De Vries et al.

(10) Patent No.: US 11,291,098 B2
(45) Date of Patent: Mar. 29, 2022

(54) LIGHTING SYSTEM AND METHOD OF CONTROLLING A LIGHTING SYSTEM

(71) Applicant: SIGNIFY HOLDING B.V., Eindhoven (NL)

(72) Inventors: Judith Hendrika Maria De Vries, Eindhoven (NL); Dennis Van De Meulenhof, Eindhoven (NL); Ralf Gertruda Hubertus Voncken, Eindhoven (NL); Dominika Lekse, Eindhoven (NL); Tom Verhoeven, Eindhoven (NL); Alexandre Georgievich Sinitsyn, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 1 day.

(21) Appl. No.: 16/492,543

(22) PCT Filed: Apr. 4, 2018

(86) PCT No.: PCT/EP2018/058553
§ 371 (c)(1),
(2) Date: Sep. 9, 2019

(87) PCT Pub. No.: WO2018/185132
PCT Pub. Date: Oct. 11, 2018

(65) Prior Publication Data
US 2021/0144834 A1    May 13, 2021

(30) Foreign Application Priority Data
Apr. 6, 2017 (EP) .................................. 17165199

(51) Int. Cl.
H05B 47/10 (2020.01)
H05B 47/125 (2020.01)
(Continued)

(52) U.S. Cl.
CPC ............ *H05B 47/125* (2020.01); *F21S 8/085* (2013.01); *F21V 23/0478* (2013.01); *H05B 47/12* (2020.01); *F21W 2131/103* (2013.01)

(58) Field of Classification Search
CPC .. H05B 47/105; H05B 47/115; H05B 47/125; H05B 47/19; H05B 47/195
See application file for complete search history.

(56) References Cited

U.S. PATENT DOCUMENTS 9,892,638 B2 * 2/2018 Broers ................ F21V 23/0442
10,534,370 B2 * 1/2020 Cavalcanti ............... G08G 1/04
(Continued)

FOREIGN PATENT DOCUMENTS

CN 101510356 A 8/2009
CN 102184618 A 9/2011
(Continued)

*Primary Examiner* — Tung X Le
(74) *Attorney, Agent, or Firm* — Daniel J. Piotrowski (57) ABSTRACT

A lighting system has at least one luminaire (1) for illuminating a thoroughfare (10). At least one sensor (11,12,13) detects that a fallen object (30) may be at least partially blocking said thoroughfare (10). A traffic flow monitor (11,12,13) monitors traffic flow along said thoroughfare (10). The light output by the luminaire (1) is controlled to be of a first pattern in accordance with a determination that a fallen object (30) is at least partially blocking said thoroughfare (10). The light output by the luminaire (1) is controlled to be of a second pattern in accordance with the traffic flow monitor (11,12,13) determining that traffic is flowing along said thoroughfare (10).

15 Claims, 3 Drawing Sheets

(51) Int. Cl.
    *H05B 47/12*     (2020.01)
    *F21S 8/08*     (2006.01)
    *F21V 23/04*     (2006.01)
    *F21W 131/103*     (2006.01)

(56) References Cited

U.S. PATENT DOCUMENTS

| | | | |
|---|---|---|---|
| 2012/0038281 A1* | 2/2012 | Verfuerth | H05B 45/10 |
| | | | 315/152 |
| 2013/0249409 A1* | 9/2013 | VanWagoner | H05B 45/10 |
| | | | 315/154 |
| 2014/0176347 A1* | 6/2014 | Kim | E01F 9/30 |
| | | | 340/907 |
| 2015/0035437 A1* | 2/2015 | Panopoulos | B60L 53/12 |
| | | | 315/112 |
| 2015/0145698 A1 | 5/2015 | Werner et al. | |
| 2016/0148506 A1 | 5/2016 | De Oliveira et al. | |
| 2016/0150614 A1 | 5/2016 | Randolph | |
| 2016/0150622 A1* | 5/2016 | Flinsenberg | H05B 47/175 |
| | | | 315/297 |
| 2016/0286627 A1 | 9/2016 | Chen et al. | |
| 2016/0338175 A1 | 11/2016 | Broers et al. | |

FOREIGN PATENT DOCUMENTS

| | | |
|---|---|---|
| CN | 102592461 A | 7/2012 |
| CN | 203149835 U | 8/2013 |
| CN | 105788179 A | 7/2016 |
| DE | 102013011171 A1 | 2/2014 |
| EP | 3040958 A1 | 7/2016 |
| JP | 2004326704 A | 11/2004 |
| KR | 101566184 A | 10/2015 |

\* cited by examiner

LIGHTING SYSTEM AND METHOD OF CONTROLLING A LIGHTING SYSTEM

CROSS-REFERENCE TO PRIOR APPLICATIONS

This application is the U.S. National Phase application under 35 U.S.C. § 371 of International Application No. PCT/EP2018/058553, filed on Apr. 4, 4018, which claims the benefit of European Patent Application No. 17165199.5, filed on Apr. 6, 2017. These applications are hereby incorporated by reference herein.

TECHNICAL FIELD

The present disclosure relates to a lighting system and a method of controlling a lighting system.

BACKGROUND

If a thoroughfare becomes blocked, it can be useful to warn users. A thoroughfare may be a road for vehicle use, a path for vehicle or pedestrian use, a railway track, a passageway or corridor or the like in a building, etc. Blockage of the thoroughfare may occur because some object has fallen onto the thoroughfare. The object may be for example a tree or branch or other vegetation, or for example rocks or boulders, particularly in mountainous areas. It is often the case that the warning is merely a static sign or barricade or the like which is put up by road maintenance workers or emergency services or the like once the blockage has been recognized. This however can be a slow process, potentially taking hours or more from when the thoroughfare has been blocked to the warning sign being erected. In addition, such static signs or barricades or the like are often left in place even after the blockage has cleared or been cleared.

Document D1 (US 2016/150614 A1) discloses a system which includes at least one luminaire configured to be mounted on a stationary structure, such as a lighting pole or parking structure. A control circuit is operatively coupled to the at least one luminaire and configured to detect an object in a vicinity of the at least one luminaire and to vary a characteristic of illumination produced by the at least luminaire responsive to the detection of the object.

SUMMARY

According to a first aspect disclosed herein, there is provided a lighting system, the system comprising:
at least one luminaire for illuminating a thoroughfare;
at least one sensor for detecting that a fallen object may be at least partially blocking said thoroughfare;
a traffic flow monitor for monitoring traffic flow along said thoroughfare; and
a controller system for determining that a fallen object is at least partially blocking said thoroughfare and for controlling light output by the luminaire;
the controller system being arranged to control the light output by the luminaire to be of a first pattern in accordance with a determination that a fallen object is at least partially blocking said thoroughfare, and
the controller system being arranged to control the light output by the luminaire to be of a second pattern in accordance with the traffic flow monitor determining that traffic is flowing along said thoroughfare.

In some examples, this provides control for a lighting system which can be used to indicate that a thoroughfare is blocked and also used to indicate that thoroughfare is not blocked or at least that traffic is flowing. This can be done in a dynamic way that can be accurate and up to date. This means that not only can users be provided with warnings about blockages and informed when a thoroughfare is clear (again), but also allow users to be more confident that the warnings or messages that are displayed are accurate and reliable.

The "pattern" of light output includes for example one or more of the color, intensity, flashing lights, etc. The first pattern would normally be a warning signal, such as a flashing red light. The second pattern might be a "normal" illumination, or another pattern if traffic flow is slow say.

The controller system might be or use one or more controllers. The controller(s) might be part of or local to the luminaire. Alternatively or additionally, the controller(s) might be part of a "back-end" server, which might receive inputs from plural luminaires and sensors and make a decision based on the plurality of inputs. There may be one or more controllers that are local to the luminaires and one or more controllers that are provided at the remote server, and the various local and remote controllers may control different aspects of the lighting system and/or may act cooperatively in for example receiving outputs from the at least one sensor and the traffic flow monitor and making a "collective" decision about which lighting pattern should be output by the luminaires(s).

The at least one sensor might be part of or local to the luminaire.

In some examples, the traffic flow monitor might use the same sensor that detects a fallen object, optionally in combination with other sensors, or may use a different sensor(s) altogether.

"Traffic" might be vehicles (automobiles), and/or people, etc.

In an example, the controller system comprises a controller that is provided locally to the luminaire. In an example, the controller that is provided locally to the luminaire is provided on or in a support housing of the luminaire.

In an example, the controller system comprises a controller that is remote from the luminaire, the remote controller being arranged to receive signals from at least one of the sensors for detecting a fallen object and the traffic flow monitor and to control the light output by the luminaire accordingly.

In an example, the sensor comprises at least one of a microphone for capturing audio, an accelerometer for detecting movement and/or vibration, a camera for capturing moving and/or still images, and a time-of-flight light sensor.

In an example, the traffic flow monitor comprises at least one of a microphone for capturing audio, an accelerometer for detecting movement and/or vibration, a camera for capturing moving and/or still images, and a time-of-flight light sensor.

In some examples of operation, the sensors may be regarded as sufficiently accurate and precise to allow a determination that a fallen object is blocking the thoroughfare to be made solely on the basis of the output(s) of the sensor(s). In other examples, the controller system is arranged to determine that a fallen object is at least partially blocking said thoroughfare based on one or more outputs from the at least one sensor and from the traffic flow monitor. This recognizes that the output(s) of the sensor(s) may not be very precise and may in any event be ambiguous. Using the output of the traffic flow monitor in addition improves the reliability of the determination. These alternative modes of operation may be available within the one system.

In an example, the lighting system comprises plural luminaires and plural sensors for detecting that a fallen object may be at least partially blocking said thoroughfare, the controller system being arranged to receive signals from the plural sensors, the controller system being arranged to determine on the basis of signals received at least from plural ones of the sensors that a fallen object is at least partially blocking said thoroughfare, the controller system being arranged to control the light output by at least some of the luminaires to be of a first pattern in accordance with the determination that a fallen object is at least partially blocking said thoroughfare.

The controller system may be constituted by plural controllers provided in or on the luminaires. One or more of the controllers provided in or on the luminaires may receive signals from plural sensors and individually determine on the basis of the received plural signals if a fallen object is at least partially blocking said thoroughfare. That is, the determination is made locally, but uses inputs from plural sensors and, optionally, traffic flow monitors. In another example, the plural controllers of the luminaires may in effect operate collectively to determine if a fallen object may be at least partially blocking said thoroughfare. That is, the determination is made locally, but uses inputs from plural sensors and, optionally, traffic flow monitors, and a collective decision by the plural local controllers. In other examples, in addition to the ability to make the determination locally, the controller system may comprise a controller that is remote from the luminaire. In such a case, the remote controller may receive inputs from the plural sensors and, optionally, traffic flow monitors, and make a determination of whether a fallen object is at least partially blocking said thoroughfare. The remote controller may have more of a general overview of the situation than individual controllers in or on individual luminaires. It may be therefore that a determination made by the remote controller is used to override any determination made by local controllers, and the light pattern of the plural luminaires is controlled in accordance with the determination made by the remote controller.

In an example, each of said sensors is associated with a respective luminaire. For example, a sensors may be provided on or in a support housing of the luminaire, or at least in the near vicinity of the luminaire.

In an example, the lighting system comprises plural luminaires and plural traffic flow monitors, the controller system being arranged to receive signals from the plural traffic flow monitors, the controller system being arranged to determine on the basis of signals received from plural ones of the traffic flow monitors that traffic is flowing along said thoroughfare, the controller system being arranged to control the light output by at least some of the luminaires to be of a second pattern in accordance with the determination that traffic is flowing along said thoroughfare.

Similarly to the above, the controller system may be constituted by plural controllers provided in or on the luminaires. One or more of the local controllers may receive signals from plural traffic flow monitors and make the determination individually or collectively. In other examples, again similarly to the above, in addition to the ability to make the determination locally, the controller system may comprise a controller that is remote from the luminaire. In such a case, the remote controller may receive inputs from the plural traffic flow monitors and make a determination about the traffic flow. That determination may be used for example to override a determination made by controllers that are local to the luminaires and control the light pattern of the plural luminaires accordingly.

According to a second aspect disclosed herein, there is provided a method of controlling a lighting system, the lighting system comprising at least one luminaire for illuminating a thoroughfare, the method comprising:

receiving an output from at least one sensor for detecting that a fallen object may be at least partially blocking said thoroughfare;

receiving an output from a traffic flow monitor for monitoring traffic flow along said thoroughfare;

determining that a fallen object is at least partially blocking said thoroughfare; and controlling the light output by the luminaire to be of a first pattern in accordance with a determination that a fallen object is at least partially blocking said thoroughfare, and controlling the light output by the luminaire to be of a second pattern in accordance with the traffic flow monitor determining that traffic is flowing along said thoroughfare.

BRIEF DESCRIPTION OF THE DRAWINGS

To assist understanding of the present disclosure and to show how embodiments may be put into effect, reference is made by way of example to the accompanying drawings in which.

DETAILED DESCRIPTION

As mentioned above, if a thoroughfare becomes blocked, it can be useful to warn users. A thoroughfare may be a road for vehicle use, a path for vehicle or pedestrian use, a railway track, a passageway or corridor or the like in a building, etc. Blockage of the thoroughfare may occur because some object has fallen onto the thoroughfare. The object may be for example a tree or branch or other vegetation, or for example rocks or boulders, snow fall or a landslide, etc., etc.

It is often the case that the warning is merely a static sign or barricade or the like which is put up by road maintenance workers or emergency services or the like once the blockage has been recognized. This however can be a slow process, potentially taking hours or more from when the thoroughfare has been blocked to the warning sign being erected. In addition, such static signs or barricades or the like are often left in place even after the blockage has cleared or been cleared. This can be inconvenient for vehicle users or pedestrians, etc., as they may be forced to take a detour that is unnecessary. Moreover, it can lead to vehicle users or pedestrians in effect ignoring static warning signs, as the vehicle users or pedestrians can distrust the accuracy of the warning. This is clearly undesirable and potentially presents a serious risk to users of the thoroughfare. In addition, it is often the case that static or other warning signs are left in place even after the blockage has cleared. This is again clearly undesirable and can increase users' distrust of traffic signs generally, leading again to users ignoring warning signs and ignoring other traffic signs generally.

Figure 1:
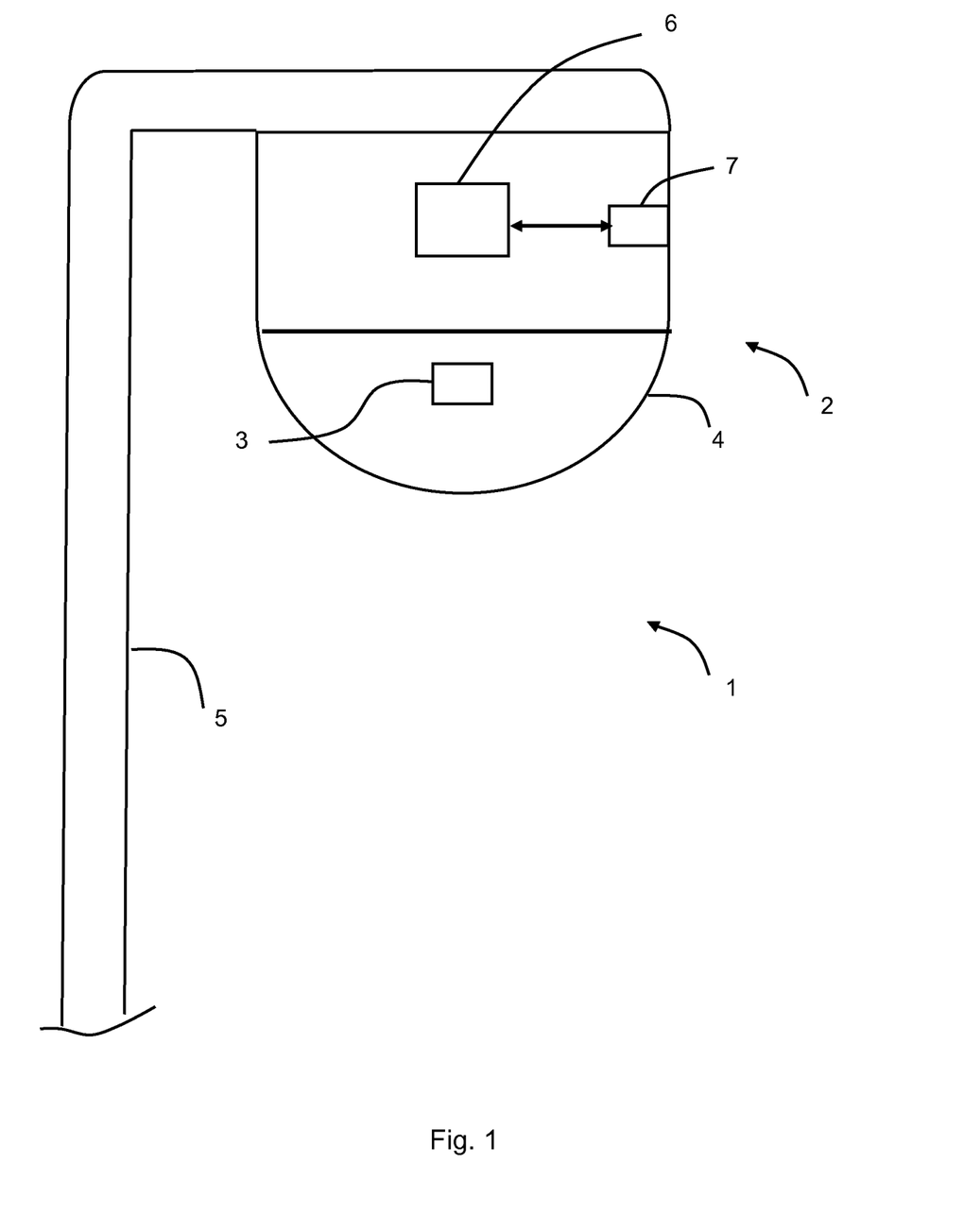
FIG. 1 shows schematically an example of a luminaire.

Referring now to FIG. 1, there is shown schematically an example of a luminaire 1 suitable for use in aspects described herein. The luminaire 1 has a light source portion 2 which includes at least one light source 3 or lamp, such as an LED-based lamp, gas-discharge lamp or filament bulb, etc., mounted within a transparent casing 4 through which light emitted by the light source 2 passes. This particular luminaire 1 is a street light and so has a pole 5 on which the light source portion 2 is mounted.

The luminaire 1 also has a controller 6 within the light source portion 2 for controlling overall operation of the luminaire 1. As is known per se, the controller 6 may comprise one or more processors. A wireless communications interface 7 which is in communication with the controller 6 is also contained within the light source portion 2. It should be noted that the physical location of the various components is only indicated schematically in FIG. 1.

The wireless communications interface 7 provides for wireless communication with external devices and/or other luminaires. The wireless communications interface 7 in this example includes the necessary circuitry to provide for wireless communications and an antenna (not shown). The wireless communication between the luminaire 1 with external devices and/or other luminaires is convenient for users, installers, managers, etc., as it means that a physical, wired connection to the luminaire 1 is not necessary. Nevertheless, wired connections may be used, instead or in addition.

The wireless communications in general may use any wireless protocol. The wireless communication between the luminaire 1 and other luminaires 1 may conveniently be by use of ZigBee™, Bluetooth™ and/or WiFi™ signals, or even using for example infrared (IR) signals. The wireless communication between the luminaire 1 and other external devices, including in particular a remote server as discussed below, may conveniently be a cellular wireless technology, such as a GSM (Group Special Mobile or 2G (second generation) network), a 3G network, or a 4G or LTE (Long Term Evolution) network, etc.

Figure 2:
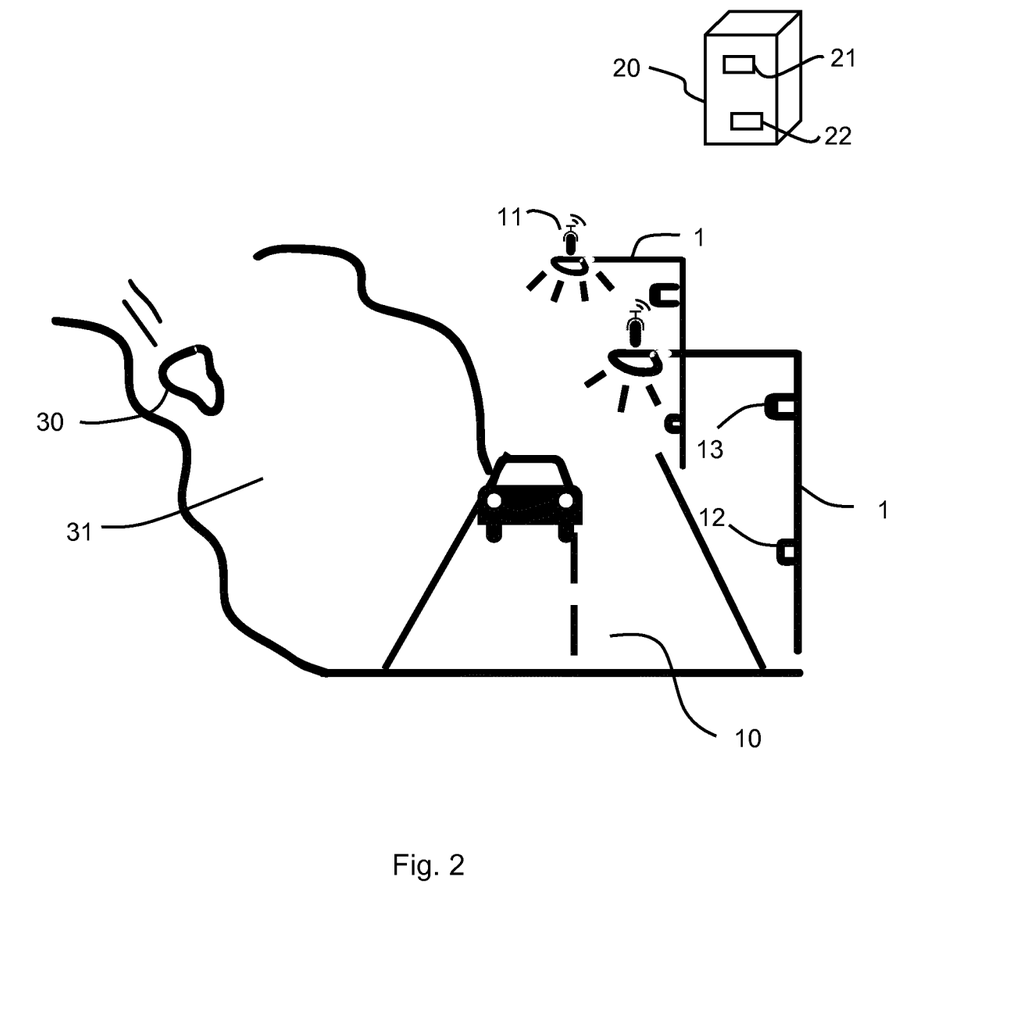
FIG. 2 shows schematically an example of luminaires adjacent a thoroughfare.

Referring now to FIG. 1, plural luminaires 1 are provided along a thoroughfare 10 to illuminate the thoroughfare 10. In this example, the thoroughfare 10 is a road, in this example passing through a mountainous area which is subject to rock fall. In other examples, the thoroughfare may be a road for vehicle use in a different terrain, a path for vehicle or pedestrian use, a railway track, a passageway or corridor or the like in a building, etc. Many such thoroughfares are prone to being blocked by for example rock fall or other fallen objects, such as trees or branches or other vegetation, objects that have fallen from other vehicles, etc., etc.

At least one sensor is provided for detecting a fallen object that is at least partially blocking the thoroughfare 10, or at least that a fallen object may be at least partially blocking the thoroughfare 10. The at least one sensor is local to the luminaires 1, or at least is provided locally of at least one of the luminaires 1. The at least one sensor may be provided on or in a luminaire 1. For example, the at least one sensor may be mounted on the pole of 5 of a street light luminaire 1, or may be mounted in or on the light source portion 2 of the luminaire 1. In some examples, there may be plural sensors. For example, each luminaire 1 may carry, or at least have associated with it, plural sensors. The sensors may be of different types. An advantage of having plural sensors of different types is that the accuracy of the system in correctly detecting a fallen object that is at least partially blocking the thoroughfare 10, leading to a lower rate of "false positives" (i.e. falsely indicating that a thoroughfare is blocked when in fact it is not.)

As a specific example, in FIG. 2 it is shown that each luminaire 1 has three sensors, all of different types. It will be understood that the luminaires 1 may have only one sensor, or two sensors of different types, or more sensors of yet further different types.

In this specific example, one sensor may be a microphone 11 for capturing audio, another sensor may be an accelerometer 12 for detecting movement and/or vibration, and another sensor may be a camera 13, which may be a video camera and/or a stills camera, for capturing moving and/or still images. It is emphasized that these are only examples of different types of sensors and configurations for the sensors, and that different luminaires 1 in the region of the thoroughfare 10 may have different arrangements of sensors (and some luminaires 1 may have no sensors at all). Also, the mounting and location of the sensors is shown only schematically in the drawings, and the sensors may in general be located anywhere on or in the luminaires 1 or in the close vicinity of the luminaires 1. Nevertheless, mounting the sensors in or on the luminaires 1 is convenient.

There is also shown a remote or "back-end" server 20. At least one and preferably plural luminaires 1 can communicate with the remote server 20. The communication may be wireless (using for example a cellular wireless protocol) and/or via a wired connection. The server 20 has a controller 21, which may for example be in the form of one or more processors, data storage 22, etc.

In the following, the operation and usage of the various sensors will be described. In general, each luminaire 1 may operate independently or autonomously on the basis of outputs received from its own sensor(s) to control its own lighting pattern which it outputs at any particular time. Alternatively or additionally, two or more luminaires 1 may exchange outputs from their own sensors; one of the luminaires 1 may then operate to control its own lighting pattern and the lighting pattern of the connected luminaire(s) 1 on the basis of the outputs of sensors received from the plural luminaires 1; alternatively or additionally, each of the connected luminaires 1 may operate to control only its own lighting pattern on the basis of the outputs received from the plural luminaires 1. Alternatively or additionally, one or more of the luminaires 1 may transmit the outputs of the sensors to the remote server 20, and the remote server 20 may operate to control the lighting pattern of one or more of the luminaires 1 (which may be the luminaires 1 that sent the sensor outputs to the remote server 20 and/or other luminaires 1) on the basis of the outputs of sensors received from the plural luminaires 1.

Figure 3:
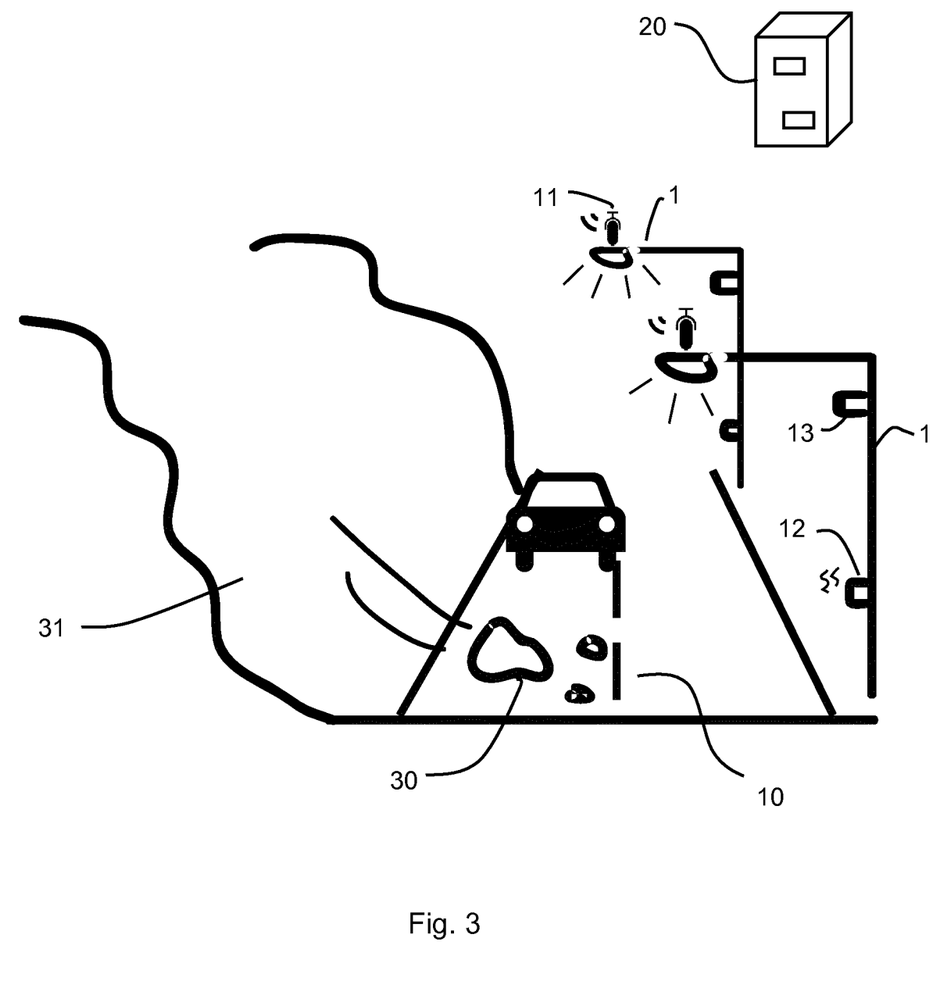
FIG. 3 shows schematically an example of luminaires adjacent a thoroughfare which has been blocked by a fallen object.

As mentioned, one type of sensor which may be used is a microphone 11 for capturing audio. The audio that is captured can be analyzed. By appropriate analysis of the audio, in general the size, the type and number of the objects that have fallen in the vicinity of the microphone 11 can be determined. In this specific example, the object may be a rock 30 which has fallen onto the road 10, though, as mentioned, the object may be any object, including for example vegetation such as a tree or branch, etc. Depending on the steepness of the slope 31 down which the rock 30 has fallen and the size of the rock 30, falling rocks 30 make a different sound. The size of the object 30 is an important factor in determining the seriousness of the situation.

In addition, analysis of captured audio of the traffic may lead to a determination that for example vehicles are slowing down or have stopped, vehicles are taking an unusual turn or rerouting, etc. This may be used to determine that an object 30 is blocking the thoroughfare. Conversely, the same information about traffic flow can be used to detect a false positive signal of the falling rock system, correlating the information with the speed of the vehicles driving by. If for example the vehicle speed does not change, there is a possibility that the rock or other object has been removed or there was not even a rock fall at that particular location in the first place.

As mentioned, and again to emphasize this, the analysis of the output from the sensors, in this case the microphones 11, can be carried out by for example the controllers 6 of the luminaires 1, either individually or collectively, and/or by the controller 21 of the remote server 20. The use of plural luminaires 1 and microphones 11 to detect falling rocks or other objects leads to increased reliability of the system. For example, the sounds of falling rocks measured by multiple luminaires 1 will have different strengths or loudness. By operating collectively, and/or by sending signals to the remote server 20 for analysis, a more precise identification of the exact location and time of falling of the fallen object can be measured.

Again as mentioned, another type of sensor which may be used is a n accelerometer 12 for detecting movement and/or vibration. The accelerometer 12 may detect vibrations on the ground or in the pole 5 of the luminaire 1 which are caused by the falling object 30 (such as a rock 30). Again, the output(s) of the accelerometer(s) 12 of the luminaire(s) 1 may be analyzed by the individual luminaires 1, collectively by the luminaires 1, and/or by the remote server 20 which receives outputs from plural accelerometers 12 of plural luminaires 1.

Another type of sensor which may be used as mentioned above is a camera 13, which may be a video camera and/or a stills camera, for capturing moving and/or still images. The camera 13 may operate to capture for example visible light and/or infrared. The images captured by the camera(s) 13 can be analyzed, for example automatically by image recognition software and/or manually by a human user, to determine whether an object 30 is blocking the thoroughfare 10. Again, in the case of automatic analysis, this can be carried out independently and/or collectively by the luminaires 1 and/or by the remote server 20. In addition, the images captured by the camera(s) 13 can be analyzed, for example automatically by image recognition software and/ or manually by a human user, to determine the status of the traffic flow. As above, this may lead to a determination that for example vehicles are slowing down, vehicles are taking an unusual turn or rerouting, etc., leading to a determination that an object 30 is blocking the thoroughfare. Conversely, the same information about traffic flow can be used to detect a false positive signal of the falling rock system, correlating the information with the speed of the vehicles driving by.

In another example, time-of-flight light sensing may be used, using for example ultrasound or some radar-based technology. This may be used to continuously measure the distance from each luminaire 1 to an area on the road or other thoroughfare. An algorithm will detect changes in the distance and, using some appropriate time interval between detections, will be able to discriminate a static object from moving cars say.

Optimally and to increase the reliability and accuracy of the analysis, including reducing the number of false positives that might otherwise be generated, the outputs from at least two different types of sensor 11, 12, 13 are analyzed to determine whether or the likelihood of an object has fallen onto or is blocking the thoroughfare 10.

The sensors 11, 12, 13 may be regarded as sufficiently accurate and precise to allow a determination that a fallen object 30 is blocking the thoroughfare 10 to be made solely on the basis of the output(s) of the sensor(s). This may be a fixed configuration of the system. In other examples, the controller system is arranged to determine that a fallen object is at least partially blocking said thoroughfare based on one or more outputs from one or more of the sensors 11, 12, 13 and from some traffic flow monitor (see further below). This recognizes that the output(s) of the sensor(s) 11, 12, 13 may not be very precise and/or may be ambiguous. Using the output of the traffic flow monitor in addition to of the output(s) of the sensor(s) improves the reliability of the determination that a fallen object 30 is blocking the thoroughfare 10. These alternative modes of operation for determining that a fallen object 30 is blocking the thoroughfare 10 may be available within the one system, and the system selects between them using for example some criteria concerning the accuracy of the sensors 11, 12, 13 and/or their outputs.

Once it has been determined that an object 30 is blocking the thoroughfare 10, or at least that it is likely that an object 30 is blocking the thoroughfare 10, the lighting pattern that is output by one or more luminaires 1 may be controlled to provide an indication of the risk or danger to users of the thoroughfare 10. As will be clear, this control of the lighting pattern may be carried out by an individual luminaire 1 if for example the individual luminaire 1 has carried out the analysis independently. In another example, one luminaire 1 may have carried out the analysis independently, but it sends out signals to one or more other luminaires 1 to control the lighting patterns of the one or more other luminaires 1. In another example, plural luminaires 1 may cooperate to analyses the outputs from the sensors of the plural luminaires and in effect decide collectively what lighting patterns should be provided by the plural luminaires 1. In another example, where the remote server 20 receives and analyses the outputs of the sensors, the remote server 20 determines the lighting patterns to be displayed by one or more luminaires 1 (which may be the same luminaires 1 that sent the sensor outputs and/or other luminaires 1) and sends control signals to the luminaires 1 accordingly.

The lighting pattern that is output by one or more luminaires 1 provide an indication of the risk or danger to users of the thoroughfare 10 may be of a number of different types. Moreover, the lighting pattern may vary according to the determined severity of the incident or blockage. Different luminaires 1 may be controlled to output different lighting patterns, depending on for example how close to the incident or blockage they are. The lighting patterns may vary in terms of color that is output. For example, red light may be output to indicate a major blockage (caused by for example a large rock 30) and an orange light may indicate a less severe blockage (caused by for example a small rock 30). Luminaires 1 that are close to the blockage may output for example a red light whereas luminaires 1 that are further away may output an orange light. Different flashing or blinking lighting patterns may be used. Moving light patterns may be used. Other types of different lighting patterns may be used.

In an example, the lighting patterns output by the luminaires 1 in the proximity or general region of the falling and fallen objects 30 may be controlled so as to warn drivers and guide them to a detour around the object 30 and avoid the affected thoroughfare 10 altogether. For example, in a mountain set up, the lighting patterns output by the luminaires 1 at the beginning of the mountain road may be controlled to start giving signals to drivers not to use the road (similar to tunnels and use of red lights).

Moreover, the results of the detour calculations may be sent to other systems, for example vehicle and/or Web-based navigation systems, by the controllers 6 of the luminaires 1 and/or the remote server 20.

Having determined that the thoroughfare 10 is blocked and the lighting patterns of one or more luminaires 1 controlled accordingly, traffic flow along the thoroughfare is determined. Again, "traffic" here may be vehicular traffic, pedestrian traffic, etc. The monitoring of the traffic flow may be carried out using for example traffic cameras. Alternatively or additionally, information concerning current traffic flow may be obtained from some publicly available source, as is provided by various local or national authorities and by motoring organizations and the like, over the Internet for example. Alternatively or additionally, the monitoring of the traffic flow may be carried out using one or more of the same sensors that are associated with or on the luminaires 1 as described above. One or more sensors for monitoring traffic flow may be installed or located temporarily in the area where the thoroughfare 10 is blocked and/or in areas where traffic flow is or is likely to be affected by the blockage.

In particular, one or more of the microphones 11 may be used to capture the sound of the traffic. Similarly to the above, this sound may be analyzed locally by controller 6 in an individual luminaire 1. Alternatively or additionally, this sound may be analyzed by plural luminaires 1 effectively acting collectively. Alternatively or additionally, captured audio may be transmitted to the remote server 20 from one or more luminaires 1 for analysis to be carried out at the remote server 20.

Similarly, one or more of the other sensors, such as the camera 13, time-of-flight sensor, etc., on or associated with one or more of the luminaires 1, may be used to monitor traffic flow. Again, this may be carried out locally by luminaires 1 operating individually and/or collectively and/or by the remote server 20 receiving the outputs of the sensors.

The remote server 20 may be arranged to receive the outputs from all of the available types of sensors on or associated with the luminaires 1 and determine the traffic flow.

If, having first determined that the thoroughfare 10 is blocked and the luminaire(s) 1 controlled to produce a first light pattern (to warn users say), it is then determined that traffic is in fact flowing along the thoroughfare 10 again, then the luminaire(s) 1 may be controlled to produce a second light pattern, which is different from the first light pattern. The second light pattern may be the default "normal" light pattern that is provided by the luminaires 1, such as a continuous white light (at least for night time). The second light pattern may be different from the default "normal" light pattern that is provided by the luminaires 1. The second light pattern may differ in accordance with the volume (i.e. flow rate) of the traffic flow which is determined. For example, if traffic is flowing, but only flowing slowly, the luminaires 1 may be controlled to have a flashing light pattern, which might be at a slower flash rate than a flash rate used for the first (warning) pattern, but in a different color, such as orange if for example a red light is used for the first (warning) pattern. Other examples of different second lighting patterns are possible. If and when the traffic flow returns to a normal rate, then the luminaires 1 may be controlled so as to have their default "normal" light pattern.

It may be determined that for one type or class of traffic, for example pedestrians or cyclists, etc., the traffic is flowing normally or relatively easily, whereas for another type or class of traffic, such as vehicle traffic, the traffic is moving slowly or not at all. The determination of the type or class of traffic and its flow rate can be carried out by for example individual luminaires 1 operating independently or autonomously on the basis of outputs received from its own sensor(s). Alternatively or additionally, two or more luminaires 1 may exchange outputs from their own sensors; one of the luminaires 1 may then operate to determine the type or class of traffic and its flow rate on the basis of the outputs of sensors received from the plural luminaires 1; alternatively or additionally, each of the connected luminaires 1 may operate to determine the type or class of traffic and its flow rate on the basis of the outputs received from the plural luminaires 1. Alternatively or additionally, one or more of the luminaires 1 may transmit the outputs of the sensors to the remote server 20, and the remote server 20 may operate to determine the type or class of traffic and its flow rate on the basis of the outputs of sensors received from the plural luminaires 1.

In some examples, a variable indicative of a fallen object at least partially blocking the thoroughfare is initially set by the sensor detecting an event. The value of the variable may be related to the severity of the incident, including particularly the severity of the effect on traffic flow. The variable may initially be set at 1 for example to indicate a full blockage. That variable is then updated based on the traffic flow monitoring. For example, the value of the variable may be set to 0 when the traffic flows through at normal speed. In some examples, the variable covers a range and, after an initial setting of the variable based on initial inputs from the sensors 11, 12, 13, the variable may be updated when the traffic flow is measured. For example to illustrate this, if the detected event is minor, the variable may be set to 0.8; when the traffic flow is measured and it is determined that traffic is flowing through at a lower speed than usual, then the number would go down slightly; if traffic approaches but there is no flow, the number would go up as apparently there is a full blockage and the initial assessment of 0.8 was too low. The light output by the luminaires 1 can be controlled in a manner related to this variable (e.g. bright red flashes at 1, white to orange color shifts for 0.5, and normal light pattern for 0).

It will be understood that the controller or control system or processor or processing system or circuitry referred to herein may in practice be provided by a single chip or integrated circuit or plural chips or integrated circuits, optionally provided as a chipset, an application-specific integrated circuit (ASIC), field-programmable gate array (FPGA), digital signal processor (DSP), graphics processing units (GPUs), etc. The chip or chips may comprise circuitry (as well as possibly firmware) for embodying at least one or more of a data processor or processors, a digital signal processor or processors, baseband circuitry and radio frequency circuitry, which are configurable so as to operate in accordance with the exemplary embodiments. In this regard, the exemplary embodiments may be implemented at least in part by computer software stored in (non-transitory) memory and executable by the processor, or by hardware, or by a combination of tangibly stored software and hardware (and tangibly stored firmware).

Reference is made herein to data storage for storing data. This may be provided by a single device or by plural devices. Suitable devices include for example a hard disk and non-volatile semiconductor memory.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A lighting system, the system comprising:
   at least one luminaire for illuminating a thoroughfare;
   at least one sensor for detecting that a fallen object being at least partially blocking said thoroughfare;
   a traffic flow monitor for monitoring traffic flow along said thoroughfare; and
   a controller system for determining that the fallen object is at least partially blocking said thoroughfare and for controlling light output by the luminaire;
   the controller system being arranged to control the light output of the luminaire to be of a first pattern and the controller system is further arranged to control the light output of the luminaire to be of a second pattern in accordance with a variable indicative of a determination that the fallen object is at least partially blocking said thoroughfare and also indicative of traffic flow via the traffic flow monitor;
   wherein the first pattern is different from the second pattern and the value of said variable is initially set by the at least one sensor for detecting the fallen object and the value of said variable is updated based on an output of the traffic flow monitoring.

2. The lighting system according to claim 1, wherein the controller system comprises a controller that is provided locally to the luminaire.

3. The lighting system according to claim 2, wherein the controller that is provided locally to the luminaire is provided on or in a support housing of the luminaire.

4. The lighting system according to claim 1, wherein the controller system comprises a controller that is remote from the luminaire, the remote controller being arranged to receive signals from at least one of the sensors for detecting the fallen object and the traffic flow monitor and to control the light output by the luminaire accordingly.

5. The lighting system according to claim 1, wherein the sensor comprises at least one of a microphone for capturing audio, an accelerometer for detecting movement and/or vibration, a camera for capturing moving and/or still images, and a time-of-flight light sensor.

6. The lighting system according to claim 1, wherein the controller system is arranged to determine that the fallen object is at least partially blocking said thoroughfare based on one or more outputs from the at least one sensor and from the traffic flow monitor.

7. The lighting system according to claim 1, comprising plural luminaires and plural sensors for detecting that the fallen object may be at least partially blocking said thoroughfare,
   the controller system being arranged to receive signals from the plural sensors,
   the controller system being arranged to determine on the basis of signals received at least from plural ones of the sensors that the fallen object is at least partially blocking said thoroughfare, the controller system being arranged to control the light output by at least some of the luminaires to be of a first pattern in accordance with the determination that the fallen object is at least partially blocking said thoroughfare.

8. The lighting system according to claim 7, wherein each of said sensors is associated with a respective luminaire.

9. The lighting system according to claim 1, comprising plural luminaires and plural traffic flow monitors,
   the controller system being arranged to receive signals from the plural traffic flow monitors,
   the controller system being arranged to determine on the basis of signals received from plural ones of the traffic flow monitors that traffic is flowing along said thoroughfare, the controller system being arranged to control the light output by at least some of the luminaires to be of a second pattern in accordance with the determination that traffic is flowing along said thoroughfare.

10. A method of controlling a lighting system, the lighting system comprising at least one luminaire for illuminating a thoroughfare, the method comprising:
    receiving an output from at least one sensor for detecting that a fallen object being at least partially blocking said thoroughfare;
    receiving an output from a traffic flow monitor for monitoring traffic flow along said thoroughfare;
    determining that the fallen object is at least partially blocking said thoroughfare; and
    controlling the light output by the luminaire to be of a first pattern and further controlling the light output of the luminaire to be of a second pattern in accordance with a variable indicative of a determination that the fallen object is at least partially blocking said thoroughfare and also indicative of traffic flow via the traffic flow monitor; and
    wherein the first pattern is different from the second pattern and the value of said variable is initially set by the at least one sensor detecting the fallen object and the value of said variable is updated based on and output of the traffic flow monitoring.

11. The method according to claim 10, wherein the control is carried out by a controller that is provided locally to the luminaire.

12. The method according to claim 11, wherein the controller that is provided locally to the luminaire is provided on or in a support housing of the luminaire.

13. The method according to claim 10, wherein the control is carried out by a controller that is remote from the luminaire, the remote controller receiving signals from at least one of the sensors for detecting the fallen object and the traffic flow monitor and controlling the light output by the luminaire accordingly.

14. The method according to claim 10, comprising determining that a fallen object is at least partially blocking said thoroughfare based on one or more outputs from the at least one sensor and from the traffic flow monitor.

15. The method according to claim 10, wherein the lighting system comprises plural luminaires and plural sensors for detecting that the fallen object may be at least partially blocking said thoroughfare, the method comprising:
    receiving signals from the plural sensors, determining on the basis of signals received at least from plural ones of the sensors that the fallen object is at least partially blocking said thoroughfare, and controlling the light output by at least some of the luminaires to be of a first pattern in accordance with the determination that the fallen object is at least partially blocking said thoroughfare.

\* \* \* \* \*